(12) United States Patent
Kim et al.

(10) Patent No.: US 8,199,280 B2
(45) Date of Patent: Jun. 12, 2012

(54) BACKLIGHT ASSEMBLY AND DISPLAY DEVICE HAVING THE SAME

(75) Inventors: Heu-Gon Kim, Yongin-si (KR); In-Sun Hwang, Suwon-si (KR); Taek-Sun Shin, Cheonan-si (KR); Byung-Seo Yoon, Incheon (KR); Yong-Woo Lee, Suwon-si (KR); Se-Ki Park, Suwon-si (KR)

(73) Assignee: Samsung Electronics Co., Ltd. (KR)

( * ) Notice: Subject to any disclaimer, the term of this patent is extended or adjusted under 35 U.S.C. 154(b) by 410 days.

(21) Appl. No.: 12/470,038

(22) Filed: May 21, 2009

(65) Prior Publication Data

US 2009/0290097 A1     Nov. 26, 2009

(30) Foreign Application Priority Data

May 23, 2008   (KR) .............................. 10-2008-48089

(51) Int. Cl.
*G02F 1/1335* (2006.01)
(52) U.S. Cl. ................ 349/65; 349/56; 349/61; 349/62; 349/67
(58) Field of Classification Search ............... 349/56, 349/61, 62, 65, 67
See application file for complete search history.

(56) References Cited

U.S. PATENT DOCUMENTS

| | | | |
|---|---|---|---|
| 6,533,428 B1 * | 3/2003 | Ogo et al. | 362/631 |
| 6,633,722 B1 | 10/2003 | Kohara et al. | |
| 2006/0221638 A1 | 10/2006 | Chew et al. | |
| 2009/0141001 A1 * | 6/2009 | Kuroda et al. | 345/175 |

FOREIGN PATENT DOCUMENTS

| | | |
|---|---|---|
| DE | 102004046256 A1 | 4/2006 |
| JP | 11-288611 A | 10/1999 |
| JP | 2001-312916 A | 11/2001 |
| JP | 2006-134748 A | 5/2006 |
| WO | 2005114273 A1 | 12/2005 |

OTHER PUBLICATIONS

European Search Report for 09006875.0-2216 dated Aug. 18, 2009.
European Examination Report for Application No. 09 006 875.0-2217 dated Feb. 15, 2012.

* cited by examiner

*Primary Examiner* — Jennifer Doan
(74) *Attorney, Agent, or Firm* — Cantor Colburn LLP

(57) ABSTRACT

A backlight assembly includes; a plurality of light guide blocks disposed substantially in parallel with each other along a first direction, each of the plurality of light guide blocks including; a light guide plate ("LGP") having a wedge-shape decreasing in thickness from a first side thereof to a second side thereof, and a light source unit disposed facing a side surface of the LGP, and a light source driving unit which individually controls the light source units of the plurality of light guide blocks to emit light via a local dimming method.

20 Claims, 9 Drawing Sheets

BACKLIGHT ASSEMBLY AND DISPLAY DEVICE HAVING THE SAME

PRIORITY STATEMENT

This application claims priority to Korean Patent Application No. 2008-48089, filed on May 23, 2008, and all the benefits accruing therefrom under 35 U.S.C. §119, the contents of which in its entirety are herein incorporated by reference.

BACKGROUND OF THE INVENTION

1. Field of the Invention

Exemplary embodiments of the present invention relate to a backlight assembly and a display device having the backlight assembly. More particularly, exemplary embodiments of the present invention relate to a backlight assembly providing a liquid crystal display ("LCD") device with light and a display device having the backlight assembly.

2. Description of the Related Art

Generally, a liquid crystal display ("LCD") device includes an LCD panel displaying an image using light and a backlight assembly disposed below the LCD panel to provide the LCD panel with the light for displaying the image.

Typically, the LCD panel includes a first substrate having a plurality of thin-film transistors ("TFTs") and a plurality of pixel electrodes formed thereon, a second substrate having a plurality of color filters and a common electrode formed thereon, and a liquid crystal layer interposed between the first and second substrates.

Typically, the backlight assembly includes a receiving container, a plurality of lamps disposed in the receiving container in parallel with each other, and an optical member disposed on the lamps to enhance characteristics of light generated from the lamps. The optical member may further include a diffusion plate diffusing light to enhance the luminance uniformity of light.

The optical member is spaced apart from the lamps in order to increase light diffusion efficiency. However, the spacing between the optical member and the lamps increases the thickness of the backlight assembly.

BRIEF SUMMARY OF THE INVENTION

Exemplary embodiments of the present invention provide a backlight assembly having a smaller thickness.

Exemplary embodiments of the present invention also provide a display device having the above-mentioned backlight assembly.

According to one exemplary embodiment of the present invention, a backlight assembly includes a plurality of light guide blocks and a light source driving unit. The light guide blocks are disposed substantially in parallel with each other along a first direction. Each of the light guide blocks includes a light guide blocks includes a light guide plate and a light source unit. The light guide plate has a wedge-shape decreasing in thickness from a first side thereof to a second side thereof. The light source unit is disposed facing a side surface of the light guide plate. The light source driving unit individually drives the light source units of each of the light guide blocks, so that each of the light source units independently emit light.

In an exemplary embodiment of the present invention, each of the light guide blocks may be arranged in a matrix shape along the first direction and a second direction substantially perpendicular to the first direction. Alternative exemplary embodiments include configurations wherein the light guide blocks may be arranged in a matrix shape along the first direction and a second direction substantially perpendicular to the first direction.

In an exemplary embodiment of the present invention, each of the light guide blocks may further include a reflective sheet disposed below the light guide plate.

In an exemplary embodiment of the present invention, the light source unit may include an electrical substrate on which at least one light-emitting unit are disposed. The light-emitting unit may face a lateral surface of the light guide plate.

In an exemplary embodiment of the present invention, the electrical substrate may be disposed in an overlapping manner with an adjacent light guide plate whose overlap portion with the electrical substrate is also overlap with the lateral surface. In another exemplary embodiment, the at least one light-emitting unit may include a plurality of light-emitting chips disposed on the electrical substrate substantially in parallel with each other along a second direction substantially perpendicular to the first direction.

In an exemplary embodiment of the present invention, the light-emitting unit may include a white light-emitting diode (LED). Alternative exemplary embodiments include configurations wherein the light-emitting unit may include a red LED which emits a red light, a green LED which emits a green light, and a blue LED which emits a blue light. In such an exemplary embodiment, each of the red, green and blue LEDs may be individually controlled by the light source driving unit.

In an exemplary embodiment of the present invention, the light guide plate may include a main body and a light incident portion. The main body decreases in thickness from a light importing portion to an opposing portion facing the light importing portion. The light incident portion may deliver light from the light source unit to the light importing portion of the main body. In such an exemplary embodiment, the light incident portion may overlap another opposite surface of an adjacent light guide plate.

In an exemplary embodiment of the present invention, the main body may include a light exiting part and a light reflecting part. The light exiting part may include a plurality of first optical structures each of which is side by side in a first direction while extending in a second direction, perpendicular to the first direction. The light reflecting part may include a plurality of second optical structures extending in the first direction.

In an exemplary embodiment of the present invention, the light guide blocks may be integrated to each other.

According to another exemplary embodiment of the present invention, a backlight assembly includes a plurality of light guide blocks and a light source unit. The light guide blocks are disposed substantially in parallel with each other along a first direction. Each of the light guide blocks includes a light guide plate having a wedge-shape decreasing in thickness from a first side thereof to a second side thereof. The light guide plate includes a main body and a light incident portion. The main body decreases in thickness from a light importing portion to an opposing portion facing the light importing portion. The light incident portion delivers light from the light source unit to the light importing portion of the main body. The light source unit emitting light is disposed to face the light importing portion.

In an exemplary embodiment of the present invention, the main body may include a light exiting part and a light reflecting part. The light exiting part may include a plurality of first optical structures each of which is side by side in a first direction while extending in a second direction, perpendicular to the first direction. The light reflecting part may include a plurality of second optical structures extending in the first direction.

In an exemplary embodiment of the present invention, the main body may further include a plurality of first prism patterns and a plurality of second prism pattern. The first prism patterns are formed on the exiting surface to extend along the first direction. The second prism patterns are formed on a lower surface of the light incident portion.

In an exemplary embodiment of the present invention, the light reflecting part may include a plurality of reflective planes formed between the second prism patterns and disposed substantially parallel with the light exiting part. In this embodiment, a distance between the reflective planes and the exiting part may decrease with distance from the light importing portion.

According to another exemplary embodiment of the present invention, a display device includes a backlight assembly and a display panel. The backlight assembly includes a plurality of light guide blocks and a light source driving unit. The light guide blocks are disposed substantially in parallel with each other along a first direction. Each of the light guide blocks includes a light guide plate and a light source unit. The light guide plate has a wedge-shape decreasing in thickness from a first side thereof to a second side thereof. The light source unit is disposed to face a side surface of the light guide plate. The light source driving unit individually drives the light source units of each of the plurality of light guide blocks, so that each of the light source units independently emits light. The display panel is disposed on the backlight assembly, which displays images using light provided from the backlight assembly.

In an exemplary embodiment of the present invention, the light guide blocks may be arranged in a matrix shape along the first direction and a second direction substantially perpendicular to the first direction.

According to some exemplary embodiments of the present invention, as each of light guide blocks that are disposed in parallel with each other along a first direction or a second direction includes an LGP of a wedge-shape and a light source unit disposed at a side of the LGP to emit light, the luminance of the light may be increased and the thickness of a backlight assembly may be decreased.

BRIEF DESCRIPTION OF THE DRAWINGS

The above and other features and advantages of the present invention will become more apparent by describing in detailed exemplary embodiments thereof with reference to the accompanying drawings, in which.

DETAILED DESCRIPTION OF THE INVENTION

Figure 1:
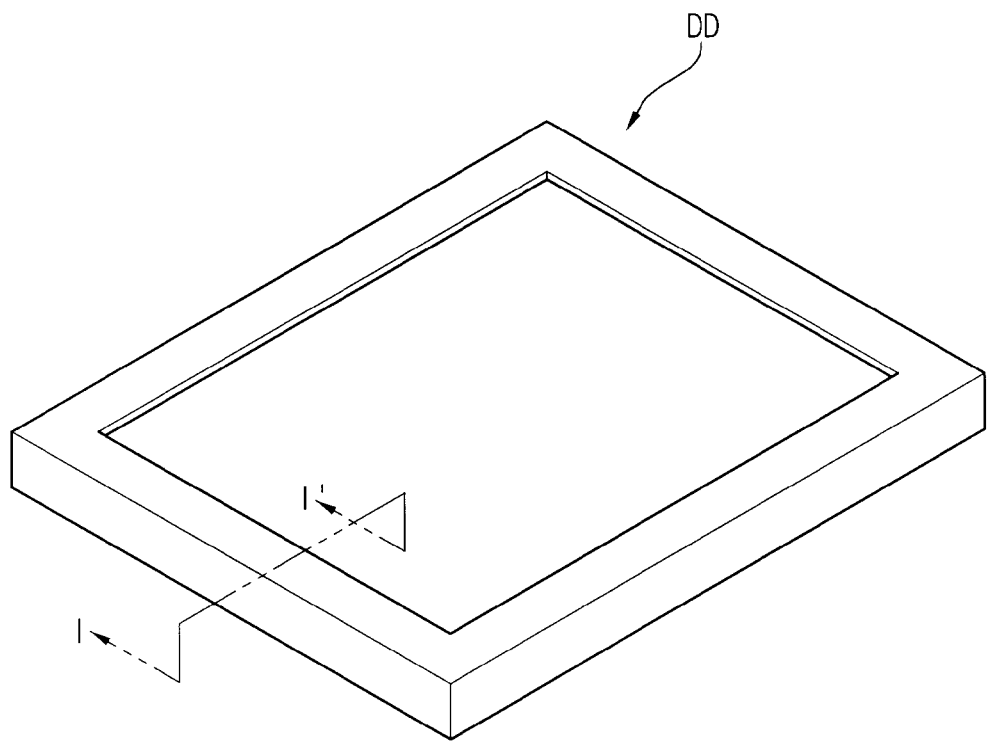
FIG. 1 is a front perspective view schematically illustrating a first exemplary embodiment of a display device according to the present invention.

The invention now will be described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being "on" another element, it can be directly on the other element or intervening elements may be present therebetween. In contrast, when an element is referred to as being "directly on" another element, there are no intervening elements present. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the present invention. As used herein, the singular forms "a," "an" and "the" are intended to include the plural forms as well, unless the context clearly indicates otherwise. It will be further understood that the terms "comprises" and/or "comprising," or "includes" and/or "including" when used in this specification, specify the presence of stated features, integers, steps, operations, elements, and/or components, but do not preclude the presence or addition of one or more other features, integers, steps, operations, elements, components, and/or groups thereof.

Exemplary embodiments of the invention are described herein with reference to cross-sectional illustrations that are schematic illustrations of idealized exemplary embodiments (and intermediate structures) of the present invention. As such, variations from the shapes of the illustrations as a result, for example, of manufacturing techniques and/or tolerances, are to be expected. Thus, embodiments of the present invention should not be construed as limited to the particular shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of the present invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, the present invention will be described in detail with reference to the accompanying drawings.

<Exemplary Embodiment 1>

Figure 2:
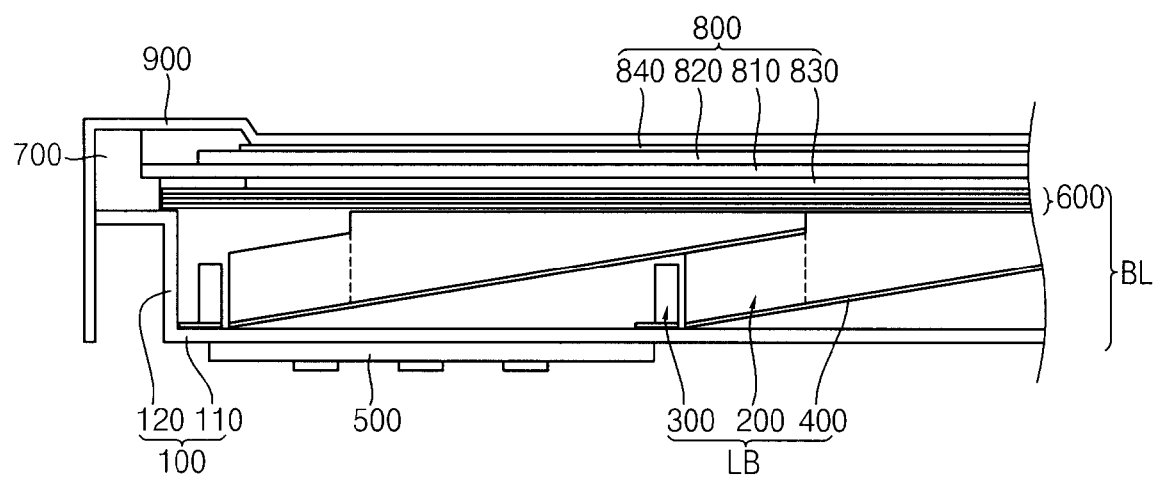
FIG. 2 is a cross-sectional view taken along line I-I' of FIG. 1.

FIG. 1 is a front perspective view schematically illustrating a first exemplary embodiment of a display device according to the present invention. FIG. 2 is a cross-sectional view taken along line I-I' of FIG. 1.

Referring to FIGS. 1 and 2, an exemplary embodiment of a display device DD according to the present invention includes a backlight assembly BL, a mold frame 700, a display panel 800 and a top chassis 900.

According to the present exemplary embodiment, the backlight assembly BL includes a receiving container 100, a plurality of light guide blocks LB, a light source driving unit 500 and an optical member 600.

The receiving container 100 includes a receiving bottom portion 110 and a receiving side portion 120 which extends from an end portion of the receiving bottom portion 110 toward an upper side thereof. The receiving container 100 may receive the light guide blocks LB.

The light guide blocks LB are disposed in the receiving container 100 substantially in parallel with each other so that light exits toward an upper portion thereof. Each of the light guide blocks LB includes a light guide plate ("LGP") 200, a light source unit 300 and a reflective sheet 400.

In the present exemplary embodiment, the LGP 200 has a wedge-shape which decreases in thickness from a first side thereof to a second side thereof. In one exemplary embodiment, the LGP 200 may include a first portion having a substantially uniform thickness attached to a wedge-shaped second portion as will be discussed in more detail below with reference to FIGS. 3 and 4. The light source unit 300 is disposed to face a side surface of the LGP 200. The light source unit 300 generates light that is incident to the LGP 200.

Exemplary embodiments of the light source unit 300 may include a cold cathode fluorescent lamp ("CCFL"), a hot cathode fluorescent lamp ("HCFL"), an external electrode fluorescent lamp ("EEFL"), a light emitting diode ("LED") emitting a point light, and various other light sources as would be know to one of ordinary skill in the art. The reflective sheet 400 is disposed below the LGP 200 and reflects light toward a lower portion of the LGP 200.

The light source driving unit 500 is electrically connected to the light source units 300 of each of the light guide blocks LB, respectively The light source driving unit 500 individually controls the light source units 300 to emit light through a local dimming method. The local dimming method controls amounts of light according to position to drive a light source so as to prevent a contrast ratio of an image from being decreased and to minimize power consumption. In the method of local dimming of the light source, the light source is divided into a plurality of light-emitting blocks to control the amounts of light of the light-emitting blocks in correspondence with dark and light areas of a display area of the LCD panel corresponding to the light-emitting blocks. For example, a light-emitting block corresponding to a display area displaying a black image is driven at a low luminance (i.e., turned off), and a light-emitting block corresponding to a display area displaying a white image is driven at a high luminance. The local dimming method may be employed to solve the disadvantage of glare. The local dimming method may have characteristics capable of controlling luminance by emitting blocks, so that an effect such as driving characteristics of a CRT or a PDP may be realized.

In one exemplary embodiment the light source driving unit 500 selects at least one of the light source units 300 to emit light having a desired luminance. That is, the light source driving unit 500 may control the light source units 300, so that the light source unit 300, which corresponds to an area where a black image is displayed, does not emit light.

In one exemplary embodiment, the light source driving unit 500 may be disposed at a lower portion of the receiving container 100, that is, an exterior surface of the receiving container 110. Alternative exemplary embodiments include configurations wherein, the light source driving unit 500 is disposed within the receiving container 100. In yet another alternative exemplary embodiment, the light source driving unit 500 may be disposed on an exterior surface or an interior surface of the receiving side portion 120.

The optical member 600 is disposed on the light guide blocks LB to enhance optical characteristics of light emitted from the light guide blocks LB. Exemplary embodiments of the optical member 600 may include a diffusion sheet, a prism sheet, and various other components which enhance optical characteristics of light from the light guide blocks LB as would be apparent to one of ordinary skill in the art.

The mold frame 700 is disposed along an edge portion of the receiving container 100. That is, in one exemplary embodiment the mold frame 700 may be disposed on the receiving container 100 along the receiving side portion 120.

The display panel 800 is disposed on the mold frame 700 to display images using light emitted from the optical member 600. The display panel 800 includes a first substrate 810, a second substrate 820 facing the first substrate 810, and a liquid crystal layer (not shown) interposed between the first and second substrate 810 and 820.

In one exemplary embodiment, the first substrate 810 may include a plurality of signal lines, a plurality of thin-film transistors ("TFTs") electrically connected to the signal lines, and a plurality of pixel electrodes, each of which is electrically connected to a respective TFT of the plurality of TFTs.

The second substrate 820 may include a plurality of color filters, each of which may be disposed in a position corresponding to an individual pixel electrode of the plurality of pixel electrodes, and a common electrode formed thereon. The light transmittance of the liquid crystal layer may be altered by an electric field formed between the pixel electrode and the common electrode. Alternative exemplary embodiments include configurations wherein the orientation of the first and second substrates may be reversed, e.g., the first substrate 820 may be disposed below the second substrate 830.

In the present exemplary embodiment, the display panel 800 may further include a first polarizing plate 830 disposed below the first substrate 810 and a second polarizing plate 840 disposed on the second substrate 820. A polarizing axis of the first polarizing plate 830 may be substantially perpendicular to that of the second polarizing plate 840.

The top chassis 900 covering an edge portion of the display panel 800 is combined with the receiving container 100 to fix the display panel 800 in a set position. In one exemplary embodiment, the top chassis 900 is combined with the receiving side portion 120 to depress an edge portion of the display panel 800, so that the display panel 800 may be prevented from being separated due to an external impact, e.g., the components of the display panel 800 are prevented from being separated and/or the display panel 800 is prevented from being separated from the mold frame 700 and the top chassis 900.

Figure 3:
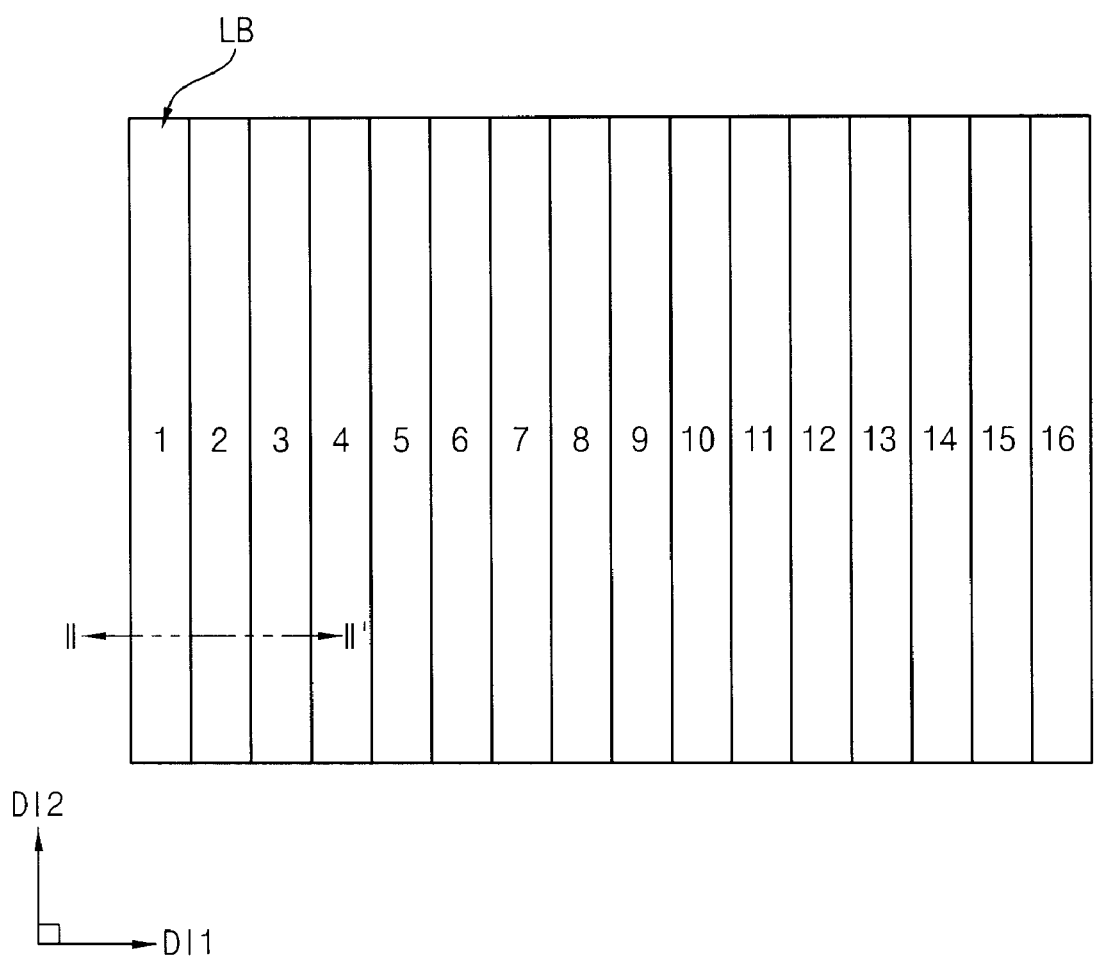
FIG. 3 is a top plan view schematically illustrating the light guide blocks of FIG. 2.
Figure 4:
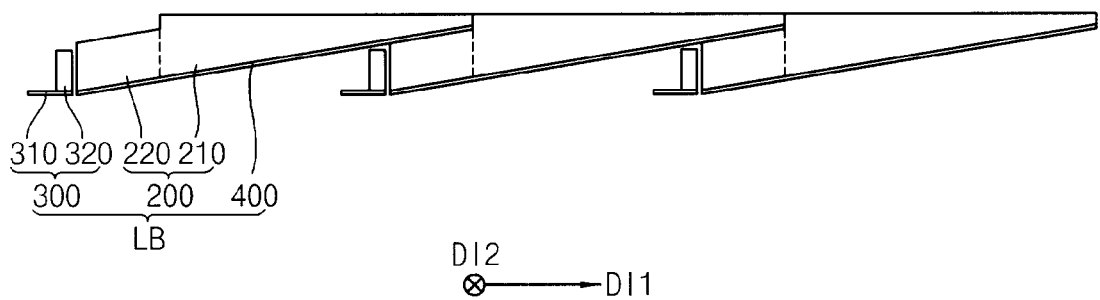
FIGS. 4 and 5 are cross-sectional views taken along line II-II' of FIG. 3.
Figure 5:
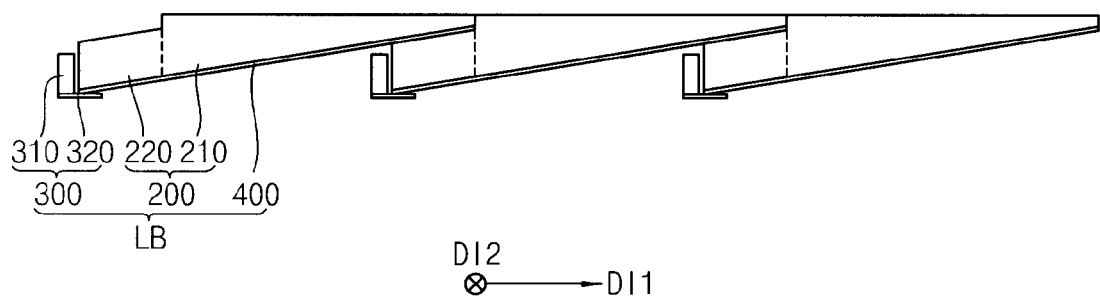

FIG. 3 is a top plan view schematically illustrating exemplary embodiments of the light guide blocks of FIG. 2. FIGS. 4 and 5 are cross-sectional views taken along line II-II' of FIG. 3.

Referring to FIGS. 3 and 4, the light guide blocks LB according to the present exemplary embodiment are disposed along a first direction DI1 substantially in parallel with each other. In the present exemplary embodiment, sixteen light guide blocks are arranged substantially in parallel with each other along the first direction DI1. Each of the light guide blocks LB has an extended shape along a second direction DI2 substantially perpendicular to the first direction DI1.

As previously discussed, in the present exemplary embodiment each of the light guide blocks LB includes the LGP 200, the light source unit 300 and the reflection sheet 400. The LGP 200 may include a main body 210 and a light incident portion 220. The main body 210 has a wedge-shape decreasing in thickness from a light importing portion into which light is incident to an opposite surface facing the light importing portion. The light incident portion 220 extends from a light importing portion of the main body 210 and is disposed to face the light source unit 300. In this exemplary embodiment, the light incident portion 220 is disposed below an opposite surface of the main body 210 of an adjacent LGP 200.

The light source unit 300 is disposed to face the light incident portion 220. The light source unit 300 generates light which becomes incident into the light incident portion 220. Light incident to the light incident portion 220 is guided by the main body 210 to exit through the main body 210.

In one exemplary embodiment, the light source unit 300 may include a electrical substrate 310 and at least one light-emitting chip 320. In the present exemplary embodiment, the electrical substrate 310 has a shape extended along the second direction DI2 and is electrically connected to the light-emitting chip 320. In one exemplary embodiment, the electrical substrate 310 may be extended from the light incident portion 220 along a direction substantially opposite to the first direction DI1 and is not overlapped with the light incident portion 220, as is illustrated in FIG. 4. Alternative exemplary embodiments include configurations wherein the electrical substrate 310 may be disposed below the light incident portion 220 and is overlapped with the light incident portion 220, as illustrated in FIG. 5.

When the electrical substrate 310 is disposed below the light incident portion 220 as illustrate in FIG. 5, the entire thickness of the display device DD may be increased by the thickness of the electrical substrate 310; however, the bezel width of the display device DD may be decreased by the width of the electrical substrate 310.

The light-emitting chip 320 is disposed on the electrical substrate 310 to face a side surface of the light incident portion 220, and is controlled by the electrical substrate 310 to emit light. In one exemplary embodiment, a plurality of light-emitting chips 320 may be disposed on the electrical substrate 310 substantially in parallel with each other along the second direction DI2.

In one exemplary embodiment, the light-emitting chip 320 may emit white light. That is, the light-emitting chip 320 may include a white light-emitting diode ("LED") which emits white light. Alternative exemplary embodiments include configurations wherein the light-emitting chip 320 may individually emit red light, green light and blue light. That is, alternative exemplary embodiments include configurations wherein the light-emitting chip 320 may include a red LED which emits red light, a green LED which emits green light and a blue LED which emits blue light.

The reflective sheet 400 may be disposed below the main body 210 and the light incident portion 220.

When the light guide blocks LB are disposed substantially in parallel with each other along the first direction and white light is emitted from the light-emitting chip 320, the light source driving unit 500 may drive the light guide blocks LB to emit light along the first direction DI1 through a one-dimensional local dimming method.

In such an exemplary embodiment, each of the light guide blocks LB, which are disposed substantially in parallel with each other along the first direction DI1, includes the LGP 200 having a wedge-shape and the light source unit 300 disposed at a side surface of the LGP 200. Thus, the luminance of images displayed on the display device DD may be increased and the thickness of the display device DD may be decreased.

In the present exemplary embodiment, the light guide blocks LB are divided into a plurality of units disposed in parallel with each other along the first direction DI1. Alternative exemplary embodiments include configurations wherein the light guide blocks LB may be connected to each other along the first direction DI1 to be formed as an integrally formed structure. That is, alternative exemplary embodiments of the LGPs 200 of the light guide blocks LB may be connected to each other to be formed as an integrally formed structure.

<Exemplary Embodiment 2>

Figure 6:
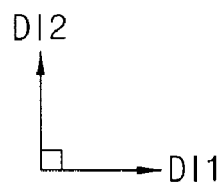
FIG. 6 is a top plan view schematically illustrating light guide blocks of a second exemplary embodiment of a display device according to the present invention.
Figure 7:
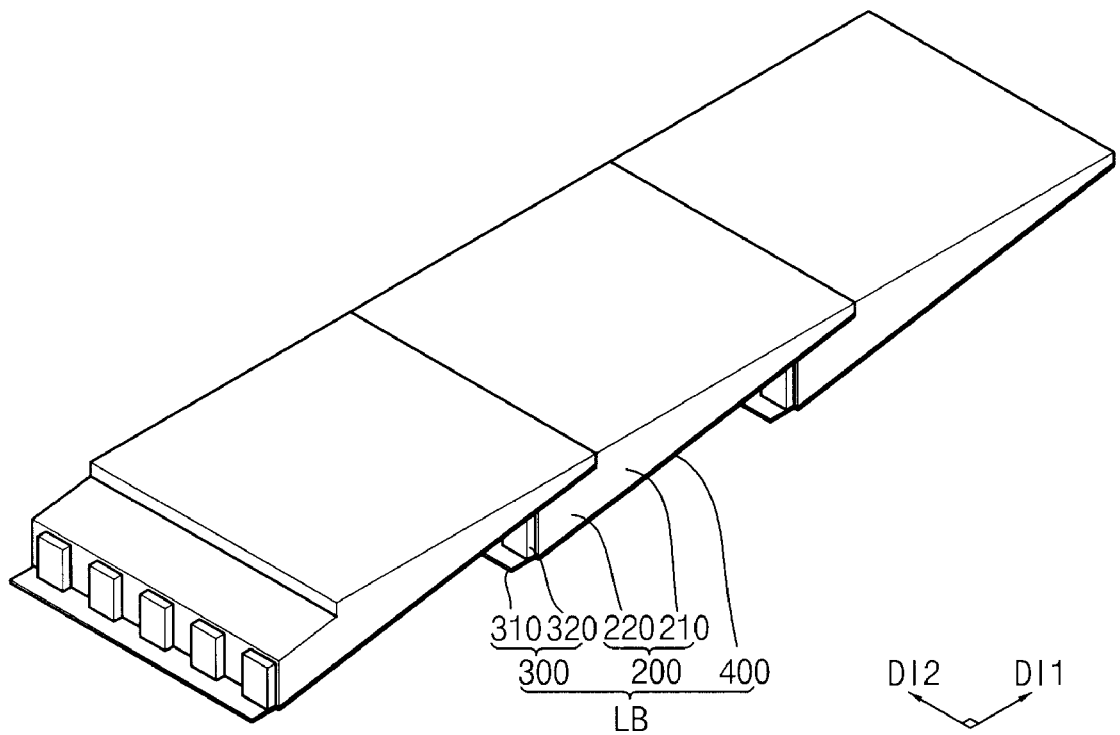
FIG. 7 is a front perspective view schematically illustrating a portion of the exemplary embodiment of the light guide blocks of FIG. 6.

FIG. 6 is a top plan view schematically illustrating light guide blocks of a display device according to a second exemplary embodiment of the present invention. FIG. 7 is a front perspective view schematically illustrating a portion of exemplary embodiments of the light guide blocks of FIG. 6.

The present exemplary embodiment of a display panel according to the present invention is substantially the same as the exemplary embodiments of display panels of FIGS. 1 to 5 except for a plurality of light guide blocks. Thus, the same reference numerals are used in FIG. 6 to refer to components that are the same or like those shown in FIGS. 1 to 5, and thus, a detailed description thereof will be omitted.

Referring to FIGS. 6 and 7, a plurality of light guide blocks LB are arranged in a matrix shape along a first direction DI1 and a second direction DI2 substantially perpendicular to the first direction DI1. In the present exemplary embodiment, the light guide blocks LB may be arranged in eight columns and sixteen rows.

Each of the plurality of light guide blocks LB includes an LGP 200, a light source unit 300 and a reflective sheet 400.

In the present exemplary embodiment, the LGP 200 may include a main body 210 and a light incident portion 220. The main body 210 has a wedge-shape decreasing in thickness from a light importing portion receiving light to an opposite surface facing the light importing portion. The light incident portion 220 extends from a light importing portion of the main body 210 and is disposed to face the light source unit 300. In the present exemplary embodiment, the light incident portion 220 is disposed below an opposite surface of the main body 210 of an adjacent LGP 200.

The light source unit 300 is disposed to face the light incident portion 220. The light source unit 300 generates light that is incident to the light incident portion 220. Exemplary embodiments of the light source unit 300 may include a electrical substrate 310 and at least one of light-emitting chip 320.

The electrical substrate 310 is electrically connected to the light-emitting chip 320. The light-emitting chip 320 is disposed on the electrical substrate 310 to face a side surface of the light incident portion 220, and is controlled by the electrical substrate 310 to emit light. In one exemplary embodiment, the light-emitting chip 320 may emit white light. That is, in one exemplary embodiment, the light-emitting chip 320 may include a white LED which emits white light.

The reflective sheet 400 may be disposed below the main body 210 and the light incident portion 220.

When the plurality of light guide blocks LB are disposed in a matrix shape along the first and second directions DI1 and DI2 and white light is emitted from the light-emitting chip 320, the light source driving unit 500 may drive the light guide blocks LB to emit light along the first and second directions DI1 and DI2 through a two-dimension local dimming method.

Figure 8:
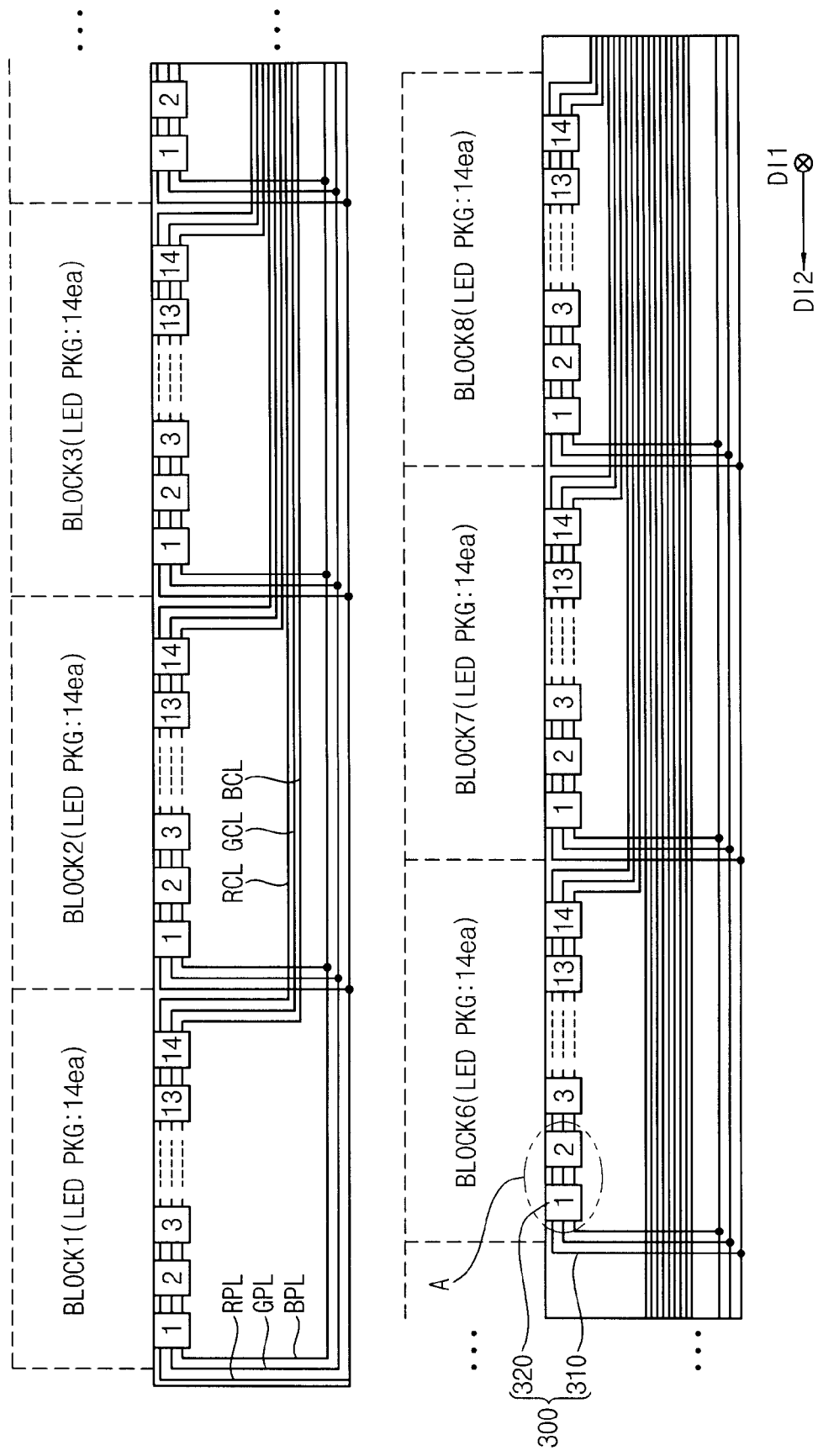
FIG. 8 is a top plan view schematically illustrating an electrical connection relationship of exemplary embodiments of light source units of the exemplary embodiments of light guide blocks of FIG. 6.
Figure 9:
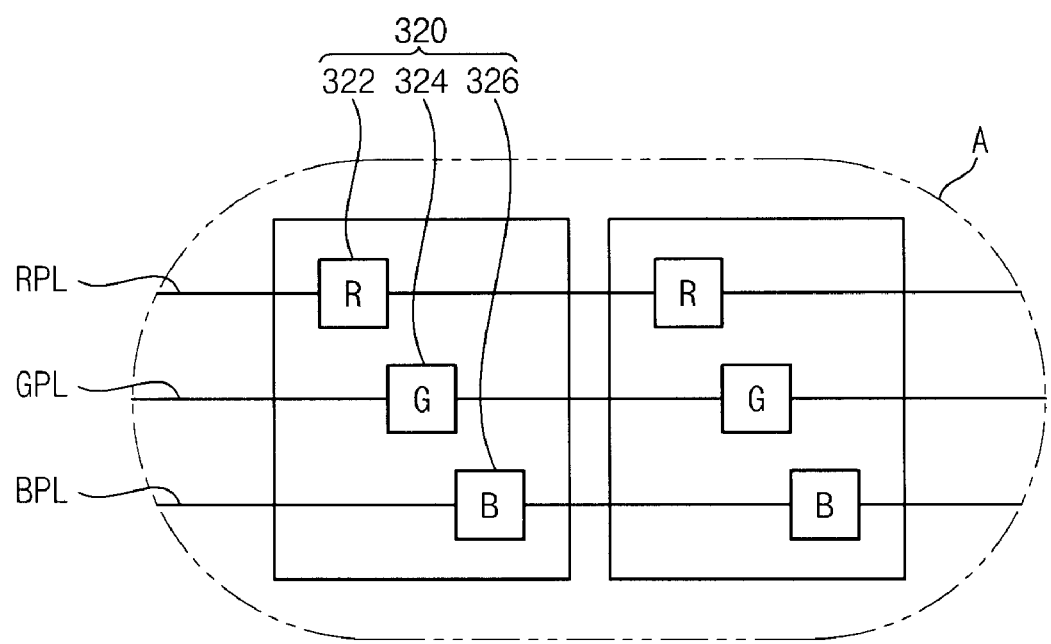
FIG. 9 is an enlarged view illustrating a portion 'A' in FIG. 8.

FIG. 8 is a top plan view schematically illustrating an electrical connection relationship of light source units of the plurality of light guide blocks of FIG. 6. FIG. 9 is an enlarged view illustrating a portion 'A' in FIG. 8.

Referring to FIGS. 8 and 9, each of the plurality of light guide blocks LB may include a plurality of light-emitting chips 320. In one exemplary embodiment, each of the plurality of light guide blocks LB may include fourteen light-emitting chips 320. Alternative exemplary embodiments may include different numbers of light-emitting chips 320 per light guide block LB, e.g., the exemplary embodiment of a light guide block LB of FIG. 7 includes five light-emitting chips 320. In the present exemplary embodiment, fourteen light-emitting chips 320 are disposed on the electrical substrate 310 in parallel with each other along the second direction DI2, and are electrically connected to each other in serial.

The electrical substrates 310 of the light guide blocks LB may have a shape which is connected to each other along the second direction DI2. That is, an integrated electrical substrate, which is extended along the second direction DI2, may be disposed by each row. In the present exemplary embodiment, each of the light-emitting chips 320 may individually emit red light, green light and blue light. That is, each of the light-emitting chips 320 may include a red LED 322 which emits red light, a green LED 324 which emits green light and a blue LED 326 which emits blue light. Here, each of the red, green and blue LEDs 322, 324 and 326 is electrically connected to each other by the light guide blocks LB in serial.

The integrated electrical substrate may include a plurality of power supply lines and a plurality of emitting control lines. The power supply lines include a red color power supply line RPL, a green color power supply line GPL and a blue color power supply line BPL. The emitting control lines include a red color emitting control line RCL, a green color emitting control line GCL and a blue color emitting control line BCL. Here, the emitting control lines may be individually connected to the light guide blocks LB, respectively.

The red color power supply line RPL is electrically connected to a first side of the red LEDs 322, that are serially connected to each other, to provide the red LEDs 322 with power. The green color power supply line GPL is electrically connected to a first side of the green LEDs 324, that are serially connected to each other, to provide the green LEDs 324 with power. The blue color power supply line BPL is electrically connected to a first side of the blue LEDs 326, that are serially connected to each other, to provide the blue LEDs 326 with power.

The red color emitting control line RCL is electrically connected to a second side of the red LEDs 322, that are serially connected to each other, to control a time which red color light is emitted. The green color emitting control line GCL is electrically connected to a second side of the green LEDs 324, that are serially connected to each other, to control a time which green color light is emitted. The blue color emitting control line BCL is electrically connected to a second side of the blue LEDs 326, that are serially connected to each other, to control a time which blue color light is emitted. Each light guide block disposed along a single column in the DI2 direction, e.g., BLOCK 1 of FIG. 8, receives individual red, green and blue color emitting control lines RCL, GCL and BCL separate from the red, green and blue color emitting control lines RCL, GCL and BCL or an adjacent light guide block disposed adjacent thereto, e.g., BLOCK 2 of FIG. 8.

As described above, when the light guide blocks LB are disposed in a matrix shape along the first and second directions DI1 and DI2 and red, green and blue color lights are individually emitted from the light-emitting chip 320, the light source driving unit 500 may drive the light guide blocks LB to emit light by colors along the first and second directions DI1 and DI2 through two-dimension local dimming method.

In this exemplary embodiment, each of the light guide blocks LB, which are disposed in a matrix shape along the first and second directions DI1 and DI2, includes the LGP 200 having a wedge-shape and the light source unit 300 disposed at a side surface of the LGP 200. Thus, the luminance of images displayed on the display device DD may be increased and the thickness of the display device DD may be decreased.

<Exemplary Embodiment 3>

Figure 10:
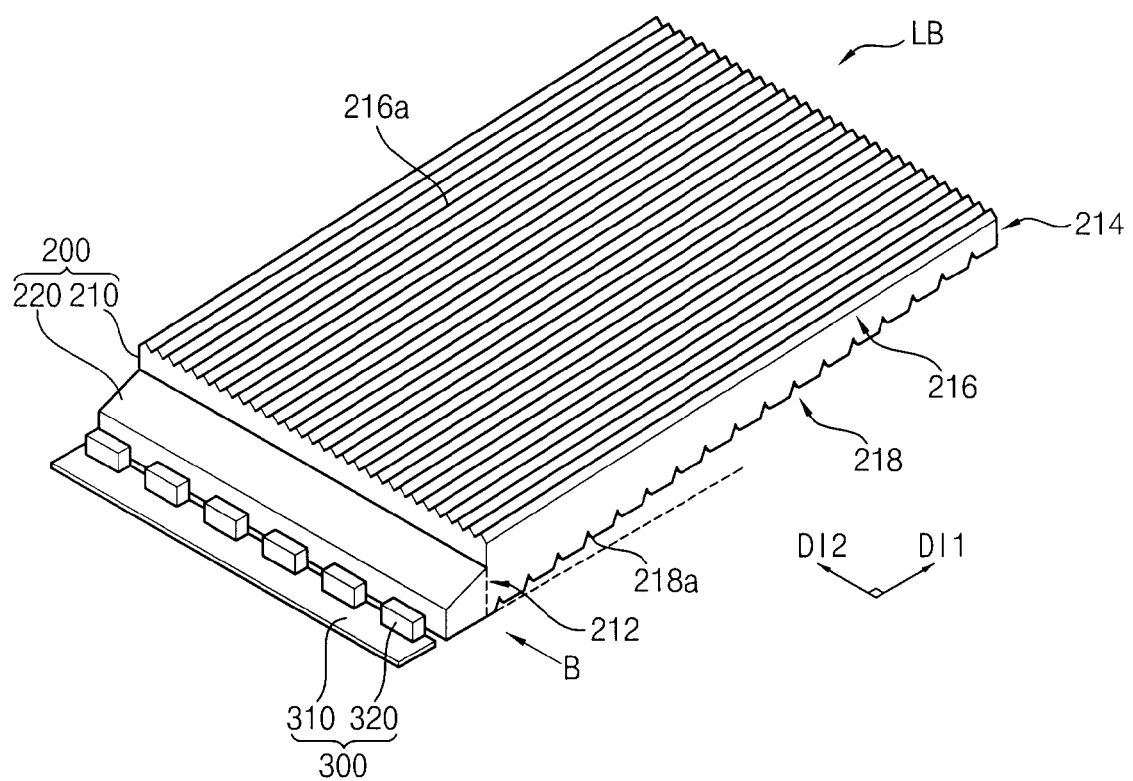
FIG. 10 is a front perspective view schematically illustrating a light guide block of a third exemplary embodiment of a display device according to the present invention.

FIG. 10 is a top perspective view schematically illustrating an exemplary embodiment of a light guide block of an exemplary embodiment of a display device according to the present invention.

The exemplary embodiment of a display panel according to the present invention is substantially the same as the display panels of FIGS. 1 to 5 except for at least a plurality of light guide blocks. Thus, the same reference numerals are used in FIG. 6 to refer to components that are the same or like those shown in FIGS. 1 to 5, and thus, a detailed description thereof will be omitted.

Referring to FIG. 10, light guide blocks LB may be disposed substantially in parallel with each other along a first direction DI1 or arranged in a matrix shape along a first direction DI1 and a second direction DI2 substantially perpendicular to the first direction DI1.

Each of the light guide blocks LB includes an LGP 200, a light source unit 300 and a reflective sheet 400. The LGP 200 may include a main body 210 and a light incident portion 220.

The main body 210 includes a light importing portion 212 receiving light, an opposite surface 214 facing the light importing portion 212, an exiting surface 216 connecting a first side of the light importing portion 212 and a first side of the opposite surface 214, and a reflective surface 218 disposed substantially opposite to the exiting surface 216.

The main body 210 has a wedge-shape decreasing in thickness from the light importing portion 212 into to the opposite surface 214. In this exemplary embodiment, the reflective surface 218 may be inclined with respect to the exiting surface 216.

A plurality of first prism patterns 216a is formed on the exiting surface 216. The first prism patterns 216a extend along the first direction DI1 and are disposed substantially in parallel with each other along the second direction DI2. In one exemplary embodiment, the first prism patterns 216a may be disposed closely adjacent to each other along the second direction DI2 such that one first prism pattern 216a directly contacts an adjacent first prism pattern 216a.

A plurality of second prism patterns 218a is formed on the reflective surface 218. The second prism patterns 218a extend along the second direction DI2 and are disposed substantially in parallel with each other along the first direction DI1. In this exemplary embodiment, the second prism patterns 218a may be troughs formed in the main body 210 in the direction of the exiting surface 216, and may be spaced apart from each other along the first direction DI1 such that one second prism pattern 218a does not directly contact an adjacent second prism pattern 218a.

The light incident portion 220 extends from a light importing portion 212 of the main body 210 and is disposed to face the light source unit 300. In such an exemplary embodiment, the light incident portion 220 is disposed below an opposite surface of the main body 210 of an adjacent LGP 200.

The light source unit 300 is disposed to face the light incident portion 220. The light source unit 300 generates light that is incident to the light incident portion 220. Exemplary embodiments of the light source unit 300 may include a electrical substrate 310 and at least one light-emitting chip 320.

The electrical substrate 310 is electrically connected to the light-emitting chip 320. The light-emitting chip 320 is disposed on the electrical substrate 310 to face a side surface of the light incident portion 220, and is controlled by the electrical substrate 310 to emit light. In one exemplary embodiment, the light-emitting chip 320 may emit white light. In an alternative exemplary embodiment, the light-emitting chip 320 may individually emit one of a red color light, a green color light and a blue color light.

The reflective sheet 400 may be disposed below the main body 210 and the light incident portion 220.

Figure 11:
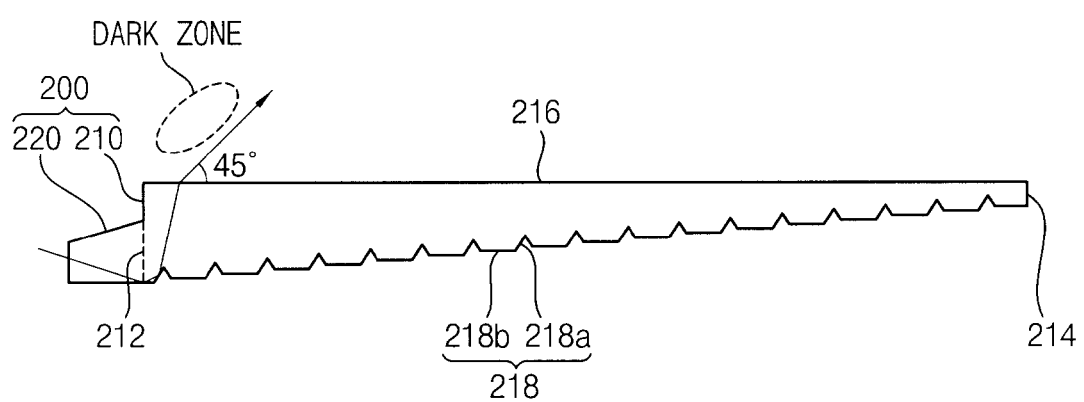
FIGS. 11 and 12 are side views illustrating the light guide block of FIG. 10 when viewed in a direction indicated by reference character "B" in FIG. 10.
Figure 12:
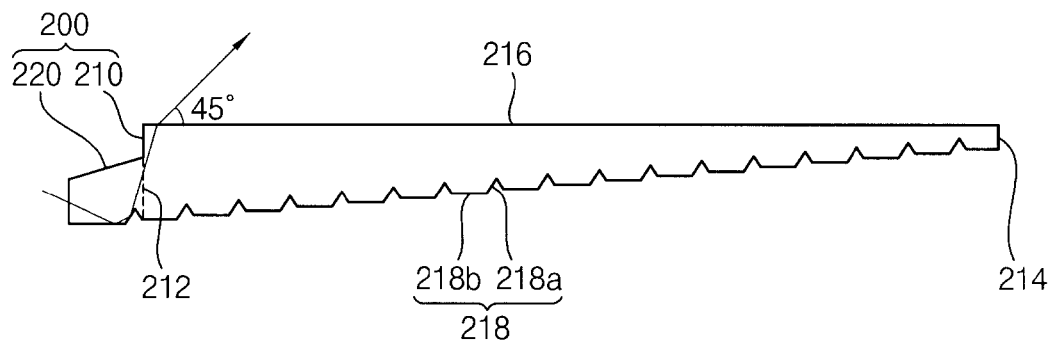

FIGS. 11 and 12 are side perspective views illustrating the exemplary embodiment of a light guide block of FIG. 10 when viewed in a direction B as indicated in FIG. 10.

Referring to FIGS. 11 and 12, the reflective surface 218 may include a plurality of reflective planes 218b formed between the second prism patterns 218a.

The reflective planes 218b connect to the second prism patterns 218a adjacent to each other. In one exemplary embodiment, the reflective planes 218b may be formed substantially parallel with the exiting surface 216. In an alternative exemplary embodiment, each of the reflective planes 218b may be inclined with respect to the exiting surface 216.

The reflective planes 218b are closer to the exiting surface 216 as they approach the opposite surface 214 from the light importing portion 212. That is, the reflective planes 218b may have a stepped shape which is close to the exiting surface 216 along the first direction DI1.

Referring to FIG. 11, an incident light that is incident to the light incident portion 220 passes the light importing portion 212 to be fully reflected at the second prism pattern 218a formed on the reflective surface 218, and then the fully reflected light is refracted by the exiting surface 216 to exit from the LGP 200. A dark zone, in which no light exits therethrough or only a small amount of light exits therethrough, may be formed in a portion of the exiting surface 216 of the LGP 200.

Referring to FIG. 12, the second prism patterns 218a maybe formed not only on a reflective surface 218 of the main body 210 but also a lower surface of the light incident portion 220.

Accordingly, when the second prism patterns 218a are formed on a lower surface of the light incident portion 220, the dark area of FIG. 11 may be removed or substantially reduced, so that the display quality of an image may be enhanced.

According to the present exemplary embodiment, as the first prism patterns 216a and the second prism patterns 218a are formed on the exiting surface 216 and the reflective surface 218, respectively, first and second prism sheets disposed on the light guide blocks LB are omitted so that manufacturing costs of a display device may be reduced. That is, light incident to the light incident portion 220 is fully reflected at the second prism patterns 218a formed on the light incident portion 220, and the fully reflected light is pass the light importing portion 212 to be refracted or fully reflected through the exiting surface 216. The fully reflected light at the exiting surface 216 is fully reflected at the reflective surface 218 of the main body 210 or the second prism patterns 218a, and the fully reflected light is refracted by the exiting surface 216 to exit from the LGP 200. Therefore, light, which is exited through the exiting surface 216 adjacent to the light incident portion 220 as described in FIG. 12, is exited in adjacent to the light exiting surface in comparison with light, which is exited through the exiting surface 216 adjacent to the light incident portion 220 as described in FIG. 11. As a result, the dark area of FIG. 11 may be removed or substantially reduced, so that the display quality of an image may be enhanced.

As described above, according to the present invention, the light guide blocks LB are arranged along a first direction substantially in parallel with each other or arranged in a matrix shape along a first direction and a second direction substantially perpendicular to the first direction, and each of the light guide blocks include the LGP having a wedge-shape and a light source unit disposed at a side surface of the LGP. Thus, the luminance of images displayed on the display device may be increased and the thickness of the display device may be decreased.

Moreover, prism sheets which will be disposed on the light guide blocks are omitted, so that manufacturing costs of a display device may be reduced.

The foregoing is illustrative of the present invention and is not to be construed as limiting thereof. Although a few exemplary embodiments of the present invention have been described, those skilled in the art will readily appreciate that many modifications are possible in the exemplary embodiments without materially departing from the novel teachings and advantages of the present invention. Accordingly, all such modifications are intended to be included within the scope of the present invention as defined in the claims. In the claims, means-plus-function clauses are intended to cover the structures described herein as performing the recited function and not only structural equivalents but also equivalent structures. Therefore, it is to be understood that the foregoing is illustrative of the present invention and is not to be construed as limited to the specific exemplary embodiments disclosed, and that modifications to the disclosed exemplary embodiments, as well as other exemplary embodiments, are intended to be included within the scope of the appended claims. The present invention is defined by the following claims, with equivalents of the claims to be included therein.

What is claimed is:

1. A backlight assembly comprising:
   a plurality of light guide blocks disposed in an interior of a receiving container, and substantially in parallel with each other along a first direction, each of the light guide blocks comprising:
   a light guide plate having a wedge-shape decreasing in thickness from a first side thereof to a second side thereof;
   a light source unit disposed facing a side surface of the light guide plate; and
   a light source driving unit individually driving the light source units of each of the light guide blocks, so that each of the light source units independently emit light,
   wherein the light source driving unit is disposed on an exterior of the receiving container.

2. The backlight assembly of claim 1, wherein each of the light guide plates of the light guide blocks extends along a second direction substantially perpendicular to the first direction.

3. The backlight assembly of claim 1, wherein the light guide blocks are arranged in a matrix shape along the first direction and a second direction substantially perpendicular to the first direction.

4. The backlight assembly of claim 1, wherein each of the light guide blocks further comprises a reflective sheet disposed below the light guide plate.

5. The backlight assembly of claim 1, wherein the light source unit comprises an electrical substrate on which at least one light-emitting unit are disposed, and the light-emitting unit faces a lateral surface of the light guide plate.

6. The backlight assembly of claim 5, wherein the electrical substrate is disposed in an overlapping manner with an adjacent light guide plate whose overlap portion with the electrical substrate is also overlap with the lateral surface.

7. The backlight assembly of claim 5, wherein the at least one light-emitting unit includes a plurality of light-emitting chips disposed on the electrical substrate substantially in parallel with each other along a second direction substantially perpendicular to the first direction.

8. The backlight assembly of claim 5, wherein the at least one light-emitting unit comprises a white light-emitting diode.

9. The backlight assembly of claim 5, wherein the at least one light-emitting unit comprises:
   a red light-emitting diode which emits a red light;
   a green light-emitting diode which emits a green light; and
   a blue light-emitting diode which emits a blue light.

10. The backlight assembly of claim 9, wherein each of the red, green and blue light-emitting diodes are individually controlled by the light source driving unit.

11. The backlight assembly of claim 1, wherein the light guide plate comprises:
    a main body decreasing in thickness from a light importing portion to an opposing portion facing the light importing portion; and
    a light incident portion which delivers light from the light source unit to the light importing portion of the main body.

12. The backlight assembly of claim 11, wherein the light incident portion overlaps with another opposite surface of an adjacent light guide plate.

13. The backlight assembly of claim 11, wherein the main body comprises a light exiting part and a light reflecting part, the light exiting part comprises a plurality of first optical structures each of which is side by side in a first direction while extending in a second direction, perpendicular to the first direction, the light reflecting part comprises a plurality of second optical structures extending in the first direction.

14. The backlight assembly of claim 1, wherein the light guide blocks are integrated to each other.

15. A display device comprising:
    a backlight assembly including:
    a plurality of light guide blocks disposed in an interior of a receiving container, and substantially in parallel with each other along a first direction, each of the light guide blocks comprising:
    a light guide plate having a wedge-shape decreasing in thickness from a first side thereof to a second side thereof; and
    a light source unit disposed to face a side surface of the light guide plate; and
    a light source driving unit individually driving the light source units of each of the plurality of light guide blocks, so that each of the light source units independently emit light; and
    a display panel disposed on the backlight assembly, which displays images using light provided from the backlight assembly,
    wherein the light source driving unit is disposed on an exterior of the receiving container.

16. The display device of claim 15, wherein the light guide blocks are arranged in a matrix shape along the first direction and a second direction substantially perpendicular to the first direction.

17. A backlight assembly comprising:
    a receiving container includes a receiving bottom portion and a receiving side portion which extends from the receiving bottom portion defining an interior of the receiving container;
    a plurality of light guide blocks disposed in the interior of the receiving container substantially in parallel with each other along a first direction, each of the light guide blocks comprising a light guide plate having a wedge-shape decreasing in thickness from a first side thereof to a second side thereof, the light guide plate comprising:
    a main body decreasing in thickness from a light importing portion to an opposing portion facing the light importing portion; and
    a light incident portion which delivers light from the light source unit to the light importing portion of the main body;
    a light source unit emitting light disposed to face the light importing portion;
    a light source driving unit is disposed on an exterior of the receiving container.

18. The backlight assembly of claim 17, wherein the main body comprises a light exiting part and a light reflecting part, the light exiting part comprises a plurality of first optical structures each of which is side by side in a first direction while extending in a second direction, perpendicular to the first direction, and the light reflecting part comprises a plurality of second optical structures extending in the first direction.

19. The backlight assembly of claim 18, wherein the main body further comprises:
   a plurality of first prism patterns formed on the exiting surface to extend along the first direction; and
   a plurality of second prism patterns formed on a lower surface of the light incident portion.

20. The backlight assembly of claim 19, wherein the light reflecting part comprises a plurality of reflective planes formed between the second prism patterns and disposed substantially parallel with the light exiting part, a distance between the reflective planes and the exiting part decreases with distance from the light importing portion.

* * * * *